April 21, 1925.
G. ZEHARLE
CLEVIS HOOK
Filed March 25, 1924
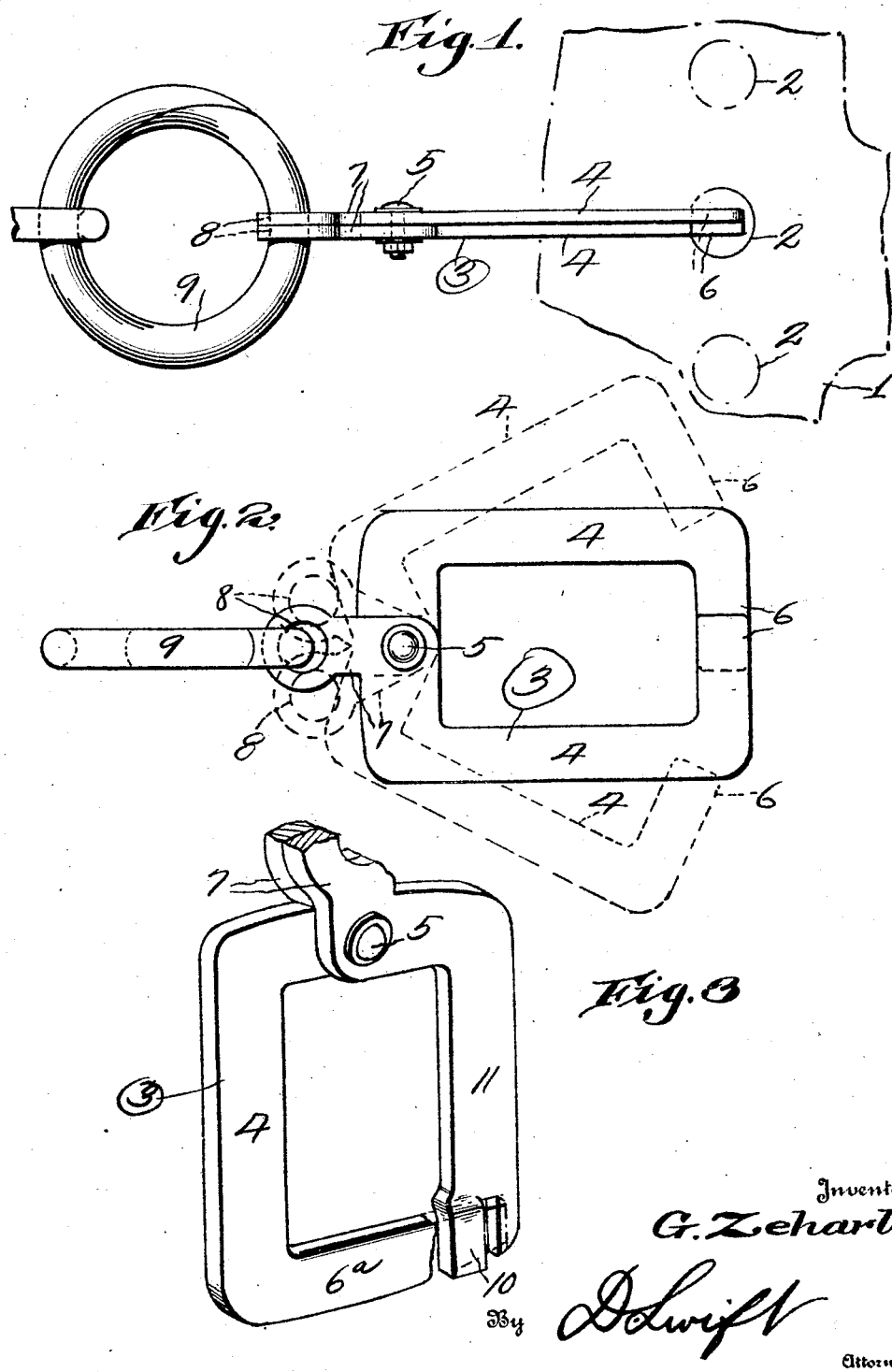
Inventor
G. Zeharle
By D. Swift
Attorney Patented Apr. 21, 1925.

1,535,010

UNITED STATES PATENT OFFICE.

GEORGE ZEHARLE, OF QUINCY, ILLINOIS.

CLEVIS HOOK.

Application filed March 25, 1924. Serial No. 701,738.

*To all whom it may concern:*

Be it known that I, GEORGE ZEHARLE, a citizen of the United States, residing at Quincy, in the county of Adams, State of Illinois, have invented a new and useful Clevis Hook; and I do hereby declare the following to be a full, clear, and exact description of the invention, such as will enable others skilled in the art to which it appertains to make and use the same.

The invention relates to clevis hooks for plows or the like, and has for its object to provide a device of this character which may be easily attached to a clevis and removed from a clevis, but when attached will be held so it will not come detached from the clevis, as is now the difficulty with conventional forms of hooks.

A further object is to form the clevis hook from pivotally connected U-shaped arms having arms extending towards each other and adapted to be received in an aperture of a clevis when in closed overlapped position. Also to provide the U-shaped members with arms having apertures therein for the reception of a split hitch ring when the hook is in closed position, and which hitch ring prevents the U-shaped members, forming the hook, from opening.

A further object is to provide interengaging means between the free ends of the pivoted members for preventing spreading of the members laterally when strain is applied thereon.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the hook showing the same applied to a conventional form of clevis.

Figure 2 is a top plan view of the hook.

Figure 3 is a perspective view of a modified form of hook.

Referring to the drawing, the numeral 1 designates a conventional form of clevis and 2 spaced apertures therein. Heretofore clevis hooks have been used, which are not positively attached to the clevis aperture 2, and consequently often become unhooked. To obviate the above difficulty the present clevis hook is primarily designed. The clevis hook 3 is formed from oppositely disposed U-shaped members 4, which members are pivotally connected together at 5 whereby they may be moved towards and away from each other to overlap their arms 6 or to move the same out of overlapped position. When applying the hook to the clevis the U-shaped members 4 are in open dotted line position as shown in Figure 2, thereby allowing the clevis to be received therebetween, and after which the U-shaped members are moved to closed position with their arms 6 extending through one of the apertures 2 of the clevis and into overlapped position as shown in Figure 2. The U-shaped members 4 have their forward ends provided with forwardly extending arms 7, which arms register with each other when the U-shaped members are in closed position, and are provided with apertures 8, which also register when the U-shaped members are in closed position. After the clevis and hook have been connected together, the split ring 9 is passed through the registering apertures 8, and to which draft animals are attached in any suitable manner. It will be seen when the split ring 9 is disposed in the apertures 8, said ring will prevent the clevis hook from coming out of cooperative engagement with the clevis, especially when a draft is not being imparted on the device by draft animals.

Referring to Figure 3 wherein a modified form is shown, it will be seen that the construction is substantially the same with the exception the U-shaped member at one side of the hook has its arm 6ᵃ relatively elongated and engaging under an integral off-set lug 10 of the L-shaped arm 11, said lug forming means for bracing the arm 6ᵃ and positively holding said arm 6ᵃ from bending outwardly from the arm 11, otherwise the construction and operation is the same as above set forth.

From the above it will be seen that a clevis hook is provided which is simple in construction, positive in its operation, and one which will not become unhooked from the clevis, and at the same time may be easily and quickly applied to a clevis.

The invention having been set forth what is claimed as new and useful is:—

The combination with a clevis, of a clevis hook therefor, said hook comprising flat reversely positioned U-shaped members, one of the arms of one of the said U-shaped members engaging and overlapping the corresponding arm of the other U-shaped member when the hook is in closed position, the other arms of said U-shaped members being pivotally connected at their outer ends, arms carried by said last named arms in the plane thereof which register when the hook is in closed position and provided with ring receiving apertures which register when the hook is in closed position, and a ring extending through said apertures when the hook is closed and adapted to be removed when the hook is to be opened.

In testimony whereof I have signed my name to this specification in the presence of two subscribing witnesses.

GEORGE ZEHARLE.

Witnesses:
HENRY WIEGMANN,
ERASTUS W. CHAPMAN.